United States Patent
Leifheit et al.

[11] Patent Number: 6,089,597
[45] Date of Patent: Jul. 18, 2000

[54] GAS GENERATOR AND METHOD FOR OPERATING A GAS GENERATOR

[75] Inventors: Markus Leifheit, Moosinning; Marc Winterhalder, Munich, both of Germany

[73] Assignee: TRW Airbag Systems GmbH & Co. KG, Aschau am Inn, Germany

[21] Appl. No.: 09/089,560

[22] Filed: Jun. 3, 1998

[30] Foreign Application Priority Data

Jun. 3, 1997 [DE] Germany ............................ 197 23 259

[51] Int. Cl.⁷ .................................................. B60R 21/26
[52] U.S. Cl. ........................................... 280/737; 280/741
[58] Field of Search .................................. 280/737, 736, 280/741, 740, 742; 102/204

[56] References Cited

U.S. PATENT DOCUMENTS

| | | | |
|---|---|---|---|
| 3,901,530 | 8/1975 | Radke . | |
| 3,960,390 | 6/1976 | Goetz | 280/737 |
| 5,022,674 | 6/1991 | Frantom et al. | 280/741 |
| 5,378,018 | 1/1995 | Ketterer et al. | 280/737 |
| 5,593,180 | 1/1997 | Cuevas et al. . | |
| 5,634,661 | 6/1997 | Dahl et al. | 280/741 |
| 5,639,986 | 6/1997 | Evans | 102/531 |
| 5,803,493 | 9/1998 | Paxton et al. | 280/737 |
| 5,806,885 | 9/1998 | Hock | 280/737 |
| 5,918,900 | 7/1999 | Ennis | 280/736 |
| 5,957,492 | 9/1999 | Hofbauer et al. | 280/737 |

FOREIGN PATENT DOCUMENTS

| | | |
|---|---|---|
| 0741064 | 4/1996 | European Pat. Off. . |
| 0769430 | 10/1996 | European Pat. Off. . |
| 19617674 | 11/1997 | Germany . |

*Primary Examiner*—Paul N. Dickson
*Attorney, Agent, or Firm*—Tarolli, Sunheim, Covell, Tummino & Szabo L.L.P.

[57] ABSTRACT

A hybrid gas generator, in particular for vehicle occupant restraint systems, has at least one combustion chamber containing propellant and at least one igniter for igniting the propellant. The igniter comprises an igniting material and is spaced from the combustion chamber and from the propellant. The gas generator further has a pressure chamber filled with compressed gas, a common outflow opening for the compressed gas and hot gas generated on deflagration of the propellant, and a bursting disc closing the outflow opening and being able to be destroyed on activation of the gas generator. The igniter is arranged upstream of the bursting disc. The igniter and the bursting disc are arranged relative to each other in such a manner and are adapted to each other in their physical and chemical characteristics such that the destruction of the bursting disc is exclusively effected by a deflagration of the ignition material. A blast wave is generated on deflagration of the ignition material, at least a part of the blast wave being directed immediately onto the bursting disc.

17 Claims, 1 Drawing Sheet

GAS GENERATOR AND METHOD FOR OPERATING A GAS GENERATOR

TECHNICAL FIELD

The invention relates to a hybrid gas generator, in particular for vehicle occupant restraint systems.

BACKGROUND OF THE INVENTION

In the case of restraint, gas generators are to make compressed gas available as quickly as possible for example for unfolding a gas bag or actuating a belt tensioner. Therefore, in the case of restraint, the bursting disc closing the outflow opening should be destroyed as early as possible. Usually the bursting disc is destroyed by the pressure rise which is caused by the combustion of the propellant. However, the time from the releasing of the igniter up to the predetermined pressure being reached, which leads to the destruction of the bursting disc, is relatively long. Therefore, attempts were made in the past to shorten this time by special measures. For example, there are gas generators in which a separate igniter is provided which serves only for the destruction of the bursting disc, which, however, increases the expenditure for the gas generator.

EP 0 673 809 A1 provides for a gas generator which, in addition to a combustion chamber in which the igniter is also provided, has a pressure chamber, filled with compressed gas, and also has a mixing chamber. Adjoining the igniter is a so-called booster charge which is intended to intensify the ignition effect, and the propellant adjoins the booster. A pressure chamber, filled with gas, communicates with the combustion chamber. A mixing chamber, in turn, is in flow connection with the combustion chamber and the pressure chamber. After ignition of the propellant, a first increase in pressure occurs in the mixing chamber. The compressed gas which is also present in the mixing chamber reacts chemically with the hot gas produced by the combustion of the propellant, whereby the pressure in the mixing chamber exceeds the predetermined pressure necessary for the destruction of the bursting disc.

From the EP 0 554 919 B1 a further gas generator is known. The latter has a pressure chamber and a propellant charge chamber, which are not connected to each other in the non-activated state. The propellant charge chamber is closed off by the bursting disc. The squib itself directly adjoins the propellant charge having a heating charge, and is integrally connected thereto. Immediately upon igniting the squib, the propellant charge is ignited. The generated gas leads to an increase in pressure in the propellant charge chamber and to a destruction of the bursting disc.

BRIEF SUMMARY OF THE INVENTION

The invention provides a hybrid gas generator which is of simpler construction and releases gas even more quickly than the known ones. The generator according to the invention has at least one combustion chamber containing propellant and at least one igniter for igniting the propellant. The igniter comprises an igniting material and is spaced from the combustion chamber and from the propellant. The gas generator further has a pressure chamber filled with compressed gas, a common outflow opening for the compressed gas and hot gas generated on deflagration of the propellant, and a bursting disc closing the outflow opening and being able to be destroyed on activation of the gas generator. The igniter is arranged upstream of the bursting disc. The igniter and the bursting disc are arranged relative to each other in such a manner and are adapted to each other in their physical and chemical characteristics such that the destruction of the bursting disc is exclusively effected by a deflagration of the ignition material. A blast wave is generated on deflagration of the ignition material, at least a part of the blast wave being directed immediately onto the bursting disc.

In the prior art according to the EP 0 673 809 A1, owing to the components of igniter, booster, propellant and compressed gas which are arranged in succession in the direction of flow, an automatic sequence of reactions takes place, with only the last reaction, namely the chemical reaction in the mixing chamber, leading to the exceeding of the threshold pressure. In the gas generator according to the EP 0 554 919 B1, the propellant charge has to be ignited first, for opening the gas generator. In the gas generator according to the invention, solely the deflagration of the ignition material effects the destruction of the bursting disc. As the igniter is spaced away from the propellant, it can have a dual function, i.e. igniting the propellant charge and opening the bursting disc. Furthermore, due to the spaced arrangement of igniter and propellant, a larger amount of propellant may be provided, because igniter and propellant do not constitute an integral unit. At least part of the blast wave arising on deflagration of the ignition material is immediately directed onto the bursting disc, i.e. the blast wave can reach the bursting disc via the shortest path, without reflection on a wall part or another obstacle. The flow path of the gas already developing on activation of the igniter up to the bursting disc can and should be kept very short, and the previously explained necessary successive reactions for the destruction of the bursting disc do not have to be run through. Thereby, as experiments have shown, shorter opening times result than in known gas generators. As the gas generator according to the invention is opened very early, not such great internal pressures develop inside the gas generator in the processes occurring after opening, as in those generators known hitherto. The walls of the gas generator can therefore also be designed thinner, which saves cost and weight. A further advantage consists in that the behavior during opening is hardly dependent on the temperature of the gas generator any more, because the reaction between the compressed gas and the produced hot gas, which is greatly dependent on the temperature of the gases reacting with each other, is no longer responsible for the opening of the gas generator.

The hot gases produced on deflagration of the ignition material in combination with the blast wave produced therewith can at least contribute to the destruction of the bursting disc. Another possibility to cause the destruction of the bursting disc consists in using such a pyrotechnic ignition material which on ignition also allows hot particles to be released in addition to gas. Here, the gas flow guidance in the gas generator is additionally designed such that these hot particles strike the bursting disc and at least also contribute to its destruction.

The two above-mentioned mechanisms for the destruction of the bursting disc can occur in each case by themselves or in combination, which can be determined by means of the physical and chemical characteristics of the ignition material and also the physical characteristics of the bursting membrane and the fluidic conditions inside the gas generator.

A preferred embodiment provides for that the igniter has a primary and a secondary charge. In the preferred embodiment of the gas generator according to the invention, a booster charge is not necessary for opening its bursting disc, which has a positive influence on construction space and costs.

According to a further embodiment, a diffuser, surrounding the igniter and spaced apart therefrom, is provided inside the gas generator. Between the diffuser and the igniter, an expansion chamber is formed for the gas developing on deflagration of the ignition material. The diffuser wall surrounding the expansion chamber has at least one passage opening towards the bursting disc, which allows a portion of the gas flow, together with the blast wave also propagating in this direction, to directly reach the bursting disc. In addition, passage openings are provided on the peripheral surface of the diffuser wall, which passage openings direct a portion of the gas to the combustion chamber. The hot gas is distributed uniformly in the expansion chamber and is partially reflected by the wall, until the reflected portion of the gas flow flows into the combustion chamber through the passage openings and leads to the ignition of the propellant there. A more reproducible ignition behavior compared with known gas generators without booster charge results from the defined distance between the propellant and the igniter. Due to the diffuser, the propellant which is usually provided in the form of tablets is not destroyed by the so-called "ignition shock" i.e. the first blast wave on activation of the igniter.

Preferably, the diffuser is constructed as a cap extending from the region of the base of the gas generator housing up to the intermediate base.

In addition, according to a further embodiment the intermediate base separates the expansion chamber from the mixing chamber and has a passage opening in the region of the expansion chamber, which passage opening is arranged and aligned such that gas produced on deflagration of the ignition material strikes directly onto the bursting disc without deflection.

By designing the gas generator according to the invention as a ring gas generator, the latter is essentially rotationally symmetrical and the igniter, the passage opening in the intermediate base and the bursting membrane are arranged concentrically to the central axis.

According to a particularly preferred embodiment, the combustion chamber is open towards the pressure chamber in the non-activated state. This means that gases generated on deflagration of the propellant can reach the pressure chamber without destroying a wall and can mix there with the compressed gas. If, additionally, the igniter and the propellant are provided in the region of that end of the gas generator opposite the bursting disc, and if also an inflow opening for hot gas into the pressure chamber is provided in this region, then the hot gas is able to flow completely through the pressure chamber up to the outflow opening. By this, a very strong intermingling of hot and cold gas is achieved.

Preferably, the compressed gas and the hot gas generated by the deflagration of the propellant react chemically on mixing, by the hot gas after-burning, whereby an increase in pressure can be achieved.

The invention further provides a method for operating a gas generator, which has a housing, a combustion chamber containing propellant and also an outflow opening for the outflow of the produced gas from the housing, the outflow opening being closed by a bursting disc which can be destroyed on activation of the gas generator.

The method according to the invention, for operating a gas generator, provides the following steps:
  Activating the igniter by an electric impulse,
  Deflagration of the ignition material,
  Destroying the bursting disc exclusively by at least one of the following steps with the aid of the blast wave materializing on deflagration of the ignition material, which blast wave strikes the bursting disc:
  a) a portion of the hot gas which develops on deflagration of the ignition material is directed immediately onto the bursting disc,
  b) on deflagration of the ignition material, hot particles are released which are directed immediately onto the bursting disc.

DETAILED DESCRIPTION OF THE DRAWING

Figure 1:
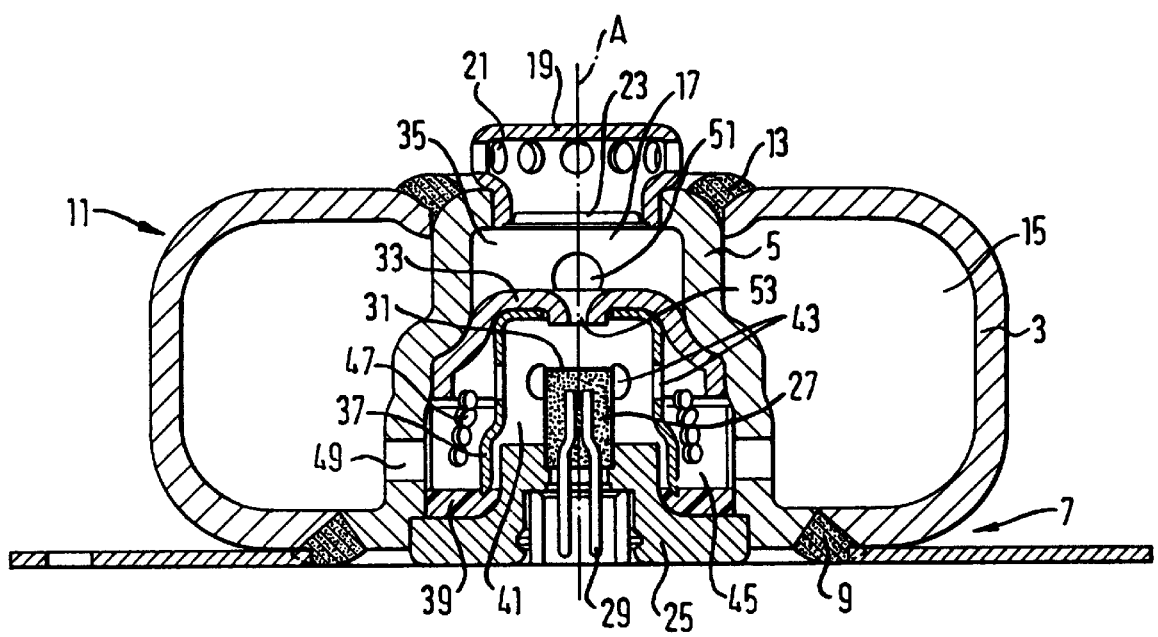

FIG. 1 shows a longitudinal sectional view through a preferred embodiment of the gas generator according to the invention.

DETAILED DESCRIPTION OF A PREFERRED EMBODIMENTS

In FIG. 1 a gas generator for a vehicle occupant restraint system is shown, which is configured as a hybrid annular gas generator and serves for the inflating of a driver's gas bag. The gas generator is constructed so as to be substantially rotationally symmetrical to the central axis A. The housing of the gas generator has an outer wall 3 and an inner wall 5 spaced radially apart therefrom. The outer and the inner walls 3 and 5, respectively, are connected with each other in a gas- and pressure-tight manner at the end 7 on the base side by means of a weld seam 9 and also on the opposite end 11 on the front side by means of a further weld seam 13. The inner wall 5 is also designated as a tension rod. Between the outer and the inner walls 3 and 5, respectively, a pressure chamber 15 is formed which is filled with compressed gas. The inner wall 5 separates the pressure chamber 15 from a radially inner space which is radially delimited by the inner wall 5. This space is divided into individual chambers. At the end 11 on the end face, the housing has the single outflow opening 17 for produced gas, which opening 17 in the non-activated state is closed in a gas- and pressure-tight manner by a cap-like closure element. The cap-like closure element comprises a diffuser 19 which is neutral with respect to thrust, with radial bores 21, and also comprises a bursting disc 23 closing the flow channel inside the diffuser 19 and welded to the end wall of the diffuser 19 facing the interior of the gas generator.

The central space delimited by the inner wall 5 is closed at the end 7 on the base side by a base plate 25. The base plate 25 is secured to the remaining housing by electrical discharge welding. An electric igniter 27 is secured in a gas- and pressure-tight manner in the base plate 25, preferably by welding, and forms a pre-assembled unit with the latter. The igniter comprises a primary charge arranged around the ignition wire connecting two wires 29 and also comprises a secondary charge surrounding the primary charge. The charges are surrounded by an ignition cap 31 which is welded to the base plate 25.

A cap-like intermediate base 33 divides the space delimited towards the outside by means of the inner wall 5 into two spaces which are separated from each other in a gas-tight manner, namely an upper space which represents a mixing chamber 35 and a lower space. This diffuser, which is designated hereinbelow as igniter diffuser to differentiate it from the diffuser 19, has a central opening on its upper end wall, by which it lies in a gas- and pressure-tight manner against the intermediate base 33. The igniter diffuser 37 is fixed in position radially by means of corresponding fits on its outer side or in its opening on the intermediate base 33. At the end of the igniter diffuser 37 on the base side, the igniter diffuser 37 lies against a disc-shaped body 39 of electrically insulating elastic material. The body 39 in turn lies against the base plate 25.

The igniter diffuser 37 divides the lower space into a radially inner expansion space 41 and a combustion chamber 45 surrounding the latter, which combustion chamber 45 is in flow connection with the expansion space 41 via several radial passage openings 43 in the igniter diffuser 37. The igniter 27, which is spaced apart from the igniter diffuser in radial and axial direction, projects into the expansion space 41.

The combustion chamber 45 is filled with propellant 47 in tablet form and is not in direct communication with the mixing chamber 35. Several radial openings 49 in the inner wall 5 provide a flow connection between the combustion chamber 45 and the pressure chamber 15. Further openings 51, only one of which is shown, in the inner wall 5, finally, provide a flow connection between the pressure chamber 15 and the mixing chamber 35. The mixing chamber 35 is connected in turn with the expansion space 41 via a centrally arranged passage opening 53 in the intermediate base 33.

The filling of the gas generator is carried out as follows: Firstly, the propellant 47 is filled into the combustion chamber 45 via the filling opening which is present when the base plate 25 is not present. Then the unit consisting of base plate 25 with igniter 27 and body 39 is placed on and the filling opening is closed. The combustion chamber is closed except for the openings 49 in the inner wall 5 and in the igniter diffuser 37, so that, particularly also because of the elastic body 39, the filling of propellant in tablet form is fixed in its position. Then, the base plate 25 is secured in a gas- and pressure-tight manner to the housing by electrical discharge welding. Here, the body 39 made of elastically insulating material prevents a short-circuit current from being able to flow via the igniter diffuser 37.

Then the gas generator is filled with compressed gas via the outflow opening 17, now serving as filling opening for compressed gas. During the filling process, the unit consisting of diffuser 19 and bursting disc 23 is arranged close to the filling opening and has compressed gas flowing around it. The compressed gas spreads in the entire interior of the gas generator, i.e. in the mixing chamber 35, in the expansion space 41, in the combustion chamber 45 and in particular in the annular pressure chamber 15 taking up the greatest volume, so that a uniform high pressure prevails inside the gas generator. Also the igniter 27 is thereby under pressure load. Then the diffuser 19 is inserted into the filling opening 17 at the end 11 on the end face and is secured to the housing in a gas- and pressure-tight manner by capacitor discharge welding. In the assembled state, the diffuser 19 projects axially with respect to the housing.

In an accident, the igniter 27 is activated by a triggering system, not shown, so that the primary and secondary charges deflagrate and produce gas. Furthermore, during the deflagration of the charges, hot particles are also produced. The ignition cap 31 is constructed in such a way that its end wall which faces the bursting disc 32 opens first, and hot gases and particles enter the expansion space 41 at high speed, accompanied by a blast wave. The hot gases expand uniformly in the expansion space 41 and are distributed therein. Since, as stated, the end wall opens first owing to star-shaped impressions provided therein, a spreading results in particular in axial direction, so that the hot gases and hot particles together with the blast wave also partially move through the passage opening 53 diverging towards the mixing chamber, without previously having lost a partial amount of their energy by impact onto a wall or other parts, and strike directly onto the bursting disc 23. The distance of the bursting disc 23 from the igniter 27 and its physical and chemical characteristics and also the position and size of the passage opening 51 are adapted to each other such that the hot gases and the hot particles in combined action with the blast wave, destroy the bursting disc 23. In fact, during producing the hot gas by the deflagration of the ignition material, there will occur secondary reactions with the compressed gas situated in the mixing chamber 35 and in the expansion space 41. However, this is of minor importance for the destruction of the bursting disc, so that its destruction is effected as good as exclusively by the deflagration of the ignition material. On account of this construction, a rapid opening of the housing is possible, so that the pressures inside the gas generator, which are produced with the subsequently occurring reactions, can be kept relatively low. Depending on the adaptation of ignition material and bursting disc 23, the latter, if desired, can be destroyed only by the hot particles in connection with the blast wave arising on deflagration of the ignition material, or only by the striking hot gases in connection with the blast wave.

The gas arrives at the flow channel inside the diffuser 19, constructed in one piece 19, via the opened outflow opening 17, is deflected in this diffuser 19 and leaves the gas generator via the numerous bores 21 without a thrust being thereby produced, and flows into the gas bag.

The hot gases and particles not flowing out via the passage opening 53, as already mentioned, are distributed uniformly in the expansion space 41, where they are partially reflected by the wall of the igniter diffuser 37 surrounding them. The gases and hot particles enter into the combustion chamber 45 via the numerous radial passage openings 43, in which combustion chamber 45 they ignite the propellant 47. By means of the igniter diffuser 37, the blast wave expanding inside the expansion chamber 41 is also prevented from continuing unimpeded into the combustion chamber 45 and from causing destruction of the propellant tablets there. After the ignition of the propellant 47, the hot gas which is developed will flow via the openings 49 into the pressure chamber 15, and also via the passage openings 43 partially back into the expansion space and from this via the passage opening 53 into the mixing chamber. The hot gas and the compressed gas are usually selected such that, on mixing, a chemical reaction takes place in the form of an afterburning of the hot gas. For this reason, the best possible mixing of the hot gas with the compressed gas is desired. In addition, this mixing also effects as homogeneous a cooling of the hot gases as possible. So that the mixing of the gases flowing into the pressure chamber 15 is facilitated, the openings 49 are preferably not exactly radially aligned. Rather, the central axes of the openings 49, viewed axially, extend obliquely to the radial direction, whereby turbulences are formed moving in circumferential direction. In addition, for enhanced turbulence, a ring provided with oblique guide faces can be provided around the outer side of the inner wall 5 in the region of the openings 49. The resulting gas mixture, which partially has a secondary reaction in the pressure chamber 15, flows via the openings 51 into the mixing chamber. The hot gas flowing via the passage opening 53 into the mixing chamber can therefore additionally react with the compressed gas. For a optimum mixing, it is also important that the openings 49 are arranged at the lower end of the pressure chamber 15, i.e. at that end of the gas generator opposite the openings 51, so that the hot gas has to pass through the entire pressure chamber 15 before it reaches the mixing chamber 17 via the openings 51.

The embodiment of the gas generator is distinguished by a simple construction which, for example, does away with a booster charge or a separate igniter for the destruction of the bursting disc 23.

Due to the fact that the destruction of the bursting disc 23 is effected as good as exclusively by means of the deflagration of the ignition material and hence very quickly, it is possible to open the bursting disc 23 approximately at the same time as the igniting of the propellant 47. Owing to the rapid opening of the gas generator, only a relatively small overpressure occurs in the gas generator itself, which reduces the material load and allows to design all walls so as to be relatively thin, resulting in advantages in terms of weight and cost.

What is claimed is:

1. A hybrid gas generator, in particular for vehicle restraint systems, comprising:
   at least one combustion chamber containing propellant,
   at least one igniter for igniting said propellant,
   said igniter comprising an igniting material and being spaced from said combustion chamber and from said propellant,
   a pressure chamber filled with compressed gas,
   a common outflow opening for said compressed gas and hot gas generated on deflagration of said propellant, and
   a bursting disc closing said outflow opening and being able to be destroyed on activation of said gas generator,
   said igniter being arranged upstream of said bursting disc,
   said igniter and said bursting disc being arranged relative to each other in such a manner and are adapted to each other in their physical and chemical characteristics such that said destruction of said bursting disc is exclusively effected by a deflagration of said ignition material, and
   a blast wave being generated on deflagration of said ignition material, at least a part of said blast wave being directed immediately onto said bursting disc, and
   a mixing chamber separated from said pressure chamber by an inner wall, said mixing chamber being arranged upstream of said bursting disc and being in flow connection with said pressure chamber via at least one opening in said inner wall.

2. The gas generator according to claim 1, wherein an intermediate base which separates said mixing chamber from said combustion chamber is provided.

3. The gas generator according to claim 1, wherein no direct flow connection is provided between said mixing chamber and said combustion chamber.

4. The gas generator according to claim 1, wherein said mixing chamber is arranged immediately upstream of said bursting disc, and said igniter is arranged at an end of said gas (generator opposite to said bursting disc and outside of said mixing chamber.

5. The gas generator according to claim 1, wherein hot gases are produced on deflagration of said ignition material, said hot gases in combination with said blast wave at least, contribute to said destruction of said bursting disc.

6. The gas generator according to claim 1, wherein said ignition material in addition to gas also produces hot particles on ignition, and wherein said gas generator being designed so that said hot particles strike said bursting disc and at least contribute to its destruction in combination with said blast wave produced therewith.

7. The gas generator according to claim 1, wherein said gas generator is a ring chamber gas generator which is rotationally symmetrical and which has a central axis.

8. The gas generator according to claim 1, wherein said igniter has a primary and a secondary charge.

9. The gas generator according to claim 8, wherein an ignition cap is provided having a wall part directed towards said bursting disc, said ignition cap surrounds said primary and said secondary charge and is constructed such that its wall part directed towards said bursting disc is opened first or activation of said igniter.

10. The gas generator according to claim 1, wherein said propellant generates a gas which reacts chemically with said compressed gas on mixing.

11. A hybrid gas generator, in particular for vehicle restraint systems, comprising:
    at least one combustion chamber containing propellant,
    at least one igniter for igniting said propellant,
    said igniter comprising an igniting material and being spaced from said combustion chamber and from said propellant,
    a pressure chamber filled with compressed gas,
    a common outflow opening for said compressed gas and hot gas generated on deflagration of said propellant, and
    a bursting disc closing said outflow opening and being able to be destroyed on activation of said gas generator,
    said igniter being arranged upstream of said bursting disc,
    said igniter and said bursting disc being arranged relative to each other in such a manner and are adapted to each other in their physical and chemical characteristics such that said destruction of said bursting disc is exclusively effected by a deflagration of said ignition material, and
    a blast wave being generated on deflagration of said ignition material, at least a part of said blast wave being directed immediately onto said bursting disc, and
    a diffuser surrounding said igniter, spaced apart therefrom and having a diffuser wall, in the interior of which diffuser an expansion chamber is formed for said gas arising on deflagration of said ignition material, and wherein an intermediate base which separates a mixing chamber from said combustion chamber is provided.

12. The gas generator according to claim 11, wherein said combustion chamber is annularly formed, wherein said diffuser separates said combustion chamber from said expansion chamber, and wherein at least one passage opening is provided in said diffuser wall, via which gas generated by deflagration of said ignition material flows from said expansion chamber into said combustion chamber.

13. The gas generator according to claim 11, wherein said gas generator housing has a base, and wherein said diffuser is constructed as a cap extending from said base of said housing to at least close to said intermediate base.

14. The gas generator according to claim 12, wherein said intermediate base separates said expansion chamber from said mixing chamber and has a passage opening in the region of said expansion chamber, which passage opening is arranged and aligned so that gas produced on deflagration of said ignition material strikes directly onto said bursting disc without being deflected.

15. The gas generator according to claim 14, wherein said gas generator is a ring chamber gas generator which is rotationally symmetrical and which has a central axis, and wherein said igniter, said passage opening in said intermediate base and said bursting disc are arranged concentrically to said central axis.

16. The gas generator according to claim 15, wherein said expansion chamber is surrounded by said combustion chamber in radial direction, wherein said mixing chamber adjoins said expansion chamber in axial direction, and wherein said mixing chamber and said combustion chamber are surrounded by said pressure chamber in radial direction.

17. The gas generator according to claim 11, wherein said mixing chamber is open towards said pressure chamber in an non-activated state of said gas generator.

* * * * *